Patented July 5, 1932

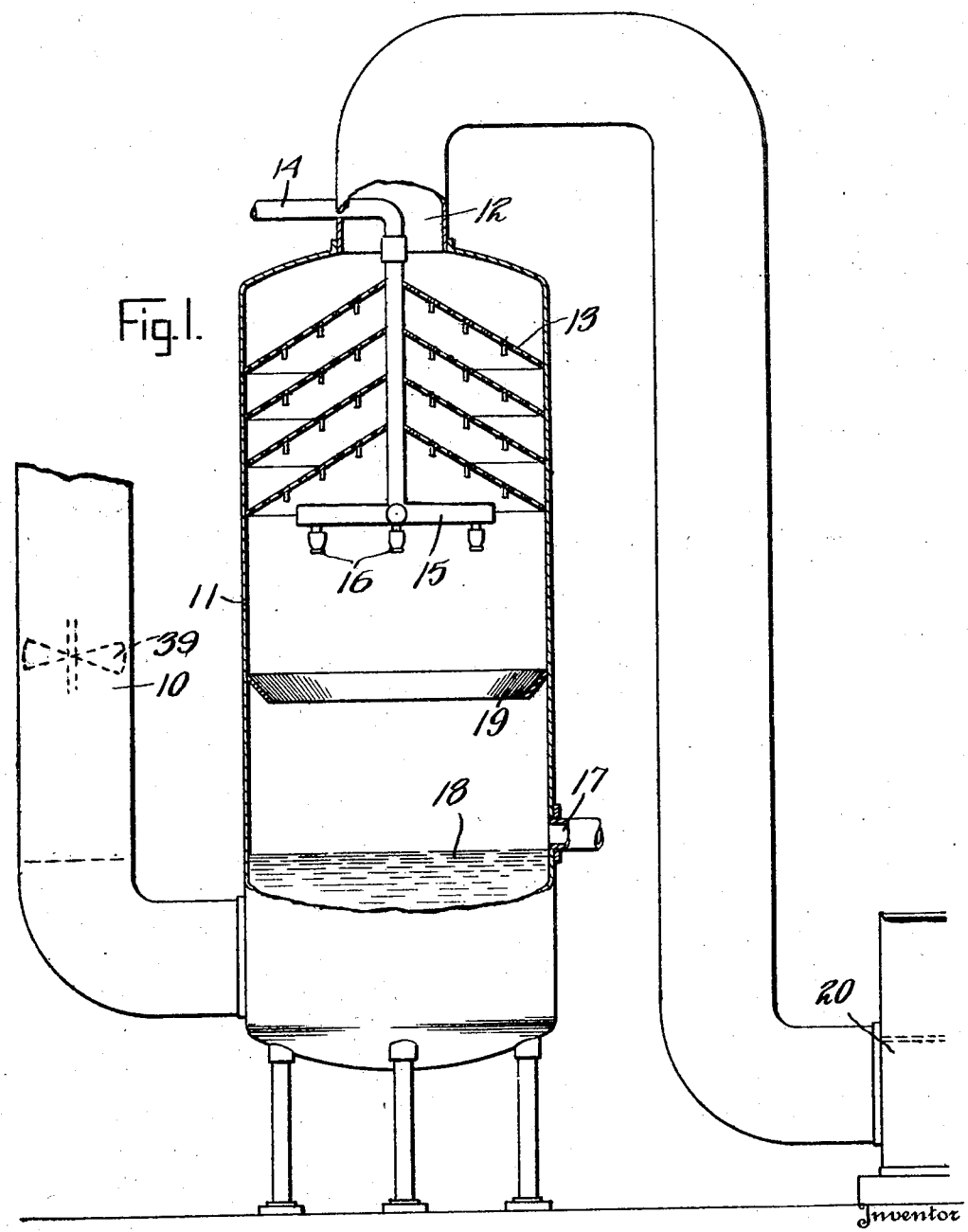

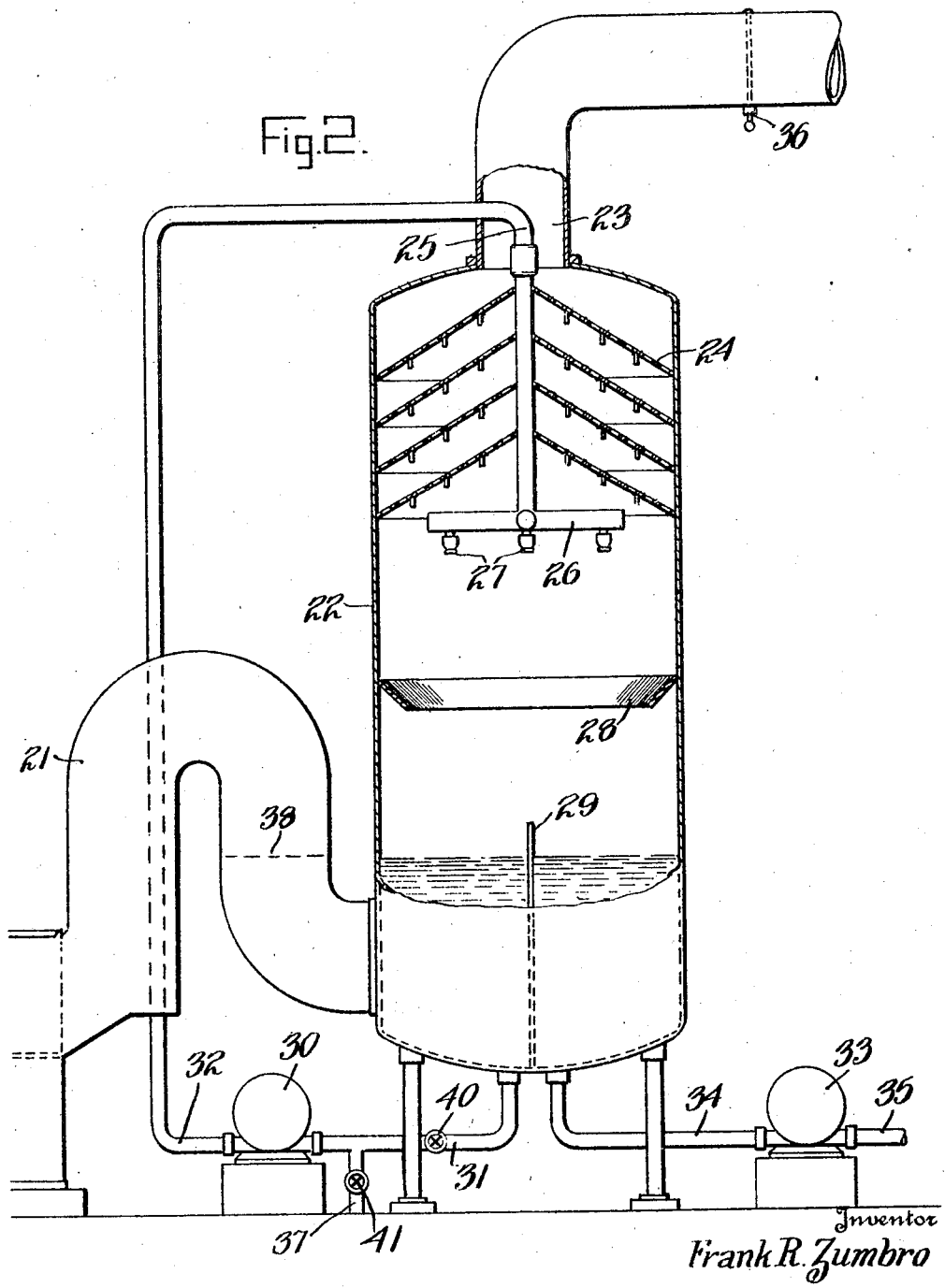

1,866,443

UNITED STATES PATENT OFFICE

FRANK R. ZUMBRO, OF WAYNESBORO, PENNSYLVANIA, ASSIGNOR TO FRICK COMPANY, OF WAYNESBORO, PENNSYLVANIA, A CORPORATION OF PENNSYLVANIA

SCRUBBING AND ABSORBING APPARATUS

Application filed January 19, 1929. Serial No. 333,560.

This invention relates to a cleaning and absorbing unit for use in the manufacture of gas. While it may be used in the cleaning, scrubbing, absorbing and recovering of a number of gases, it is particularly designed with a view to its use in the manufacture of carbon dioxide.

An object of the invention is to provide an efficient scrubbing and absorbing unit for use in the recovery of gas.

A further object is to provide scrubbing and absorbing units in which the scrubbing and absorbing liquids are sprayed into the gases in the scrubbing and absorbing tanks.

More particularly, an object is to provide a scrubbing and absorbing unit in which the gas is first bubbled through liquid in the tanks and then liquid is sprayed into the mixture of gases as distinguished from a system in which liquid is only sprayed into the mixture of gases.

Referring to the accompanying drawings, which are made a part hereof and on which similar reference characters indicate similar parts, Figure 1 is a view in elevation and partly in section of the scrubbing unit, and Figure 2 is a similar view of the absorbing unit.

In the drawings numeral 10 indicates a pipe in communication with a flue leading from a furnace or generator in which carbon dioxide is generated along with other gases. The flue 10 is attached to the lower part of a scrubbing drum or tank 11. The tank 11 is provided with an outlet 12. The upper portion of the drum has a number of perforated cone shaped baffle plates 13. A pipe 14 enters the drum near its top and extends down through the baffle plates 13 to a header 15 which header is provided with a number of spray nozzles 16 through which water entering the pipe 14 is sprayed downwardly into the tank or drum. Water from any source or from a pump not shown may be supplied to the pipe 14. A water outlet 17 is positioned somewhat above the top of the inlet pipe 10, so that in operation the drum 11 will be filled with water up to the level 18. A downwardly extending baffle ring plate 19 is positioned somewhat below the nozzles 16 by means of which the sprayed fluid is directed away from the sides of the drum. The pipe 12 leads to the intake of a blower 20 by means of which blower the fluid is delivered through a pipe 21 to the lower portion of an absorber tank 22. This tank is similar in structure to the tank 11, being provided with an outlet 23 and perforated baffle plates 24. This tank is provided with a fluid inlet 25 which extends down through the baffle plates to a header 26 through which fluid delivered through the pipe 25 is sprayed by means of spray nozzles 27. A baffle ring plate 28 is positioned somewhat beneath the nozzles 27. A partition shown at 29 is positioned with its top somewhat above the mouth of the inlet pipe 21, and provides a compartment for fluid to provide a fluid seal at the mouth of the inlet pipe 21. Shown as a whole at 30 is a liquid pump having an inlet 31 and a discharge 32. The discharge pipe connects with the pipe 25 at the top of the tank and the suction inlet 31 is connected to the compartment to the left of the partition 29. By means of the pump 30 a lye solution is circulated through the drum being sprayed into the gas in the drum through the nozzles 27 and withdrawn through the pipe 31. At 33 is another liquid pump having an inlet 34 and an outlet 35. By means of this pump the strong lye solution is withdrawn from the tank and delivered to the lye boilers, (not shown), from which the carbon dioxide may be evaporated from the lye solution. A pipe 37 leads from the lye boilers to the pipe 31. By this pipe a weak lye solution is supplied to the tank to replenish that withdrawn off by the pump 33. Pipes 31 and 37 may be controlled by valves 40 and 41.

The flue 23 may be provided with a suitable damper 36 which may be and preferably is a slide gate in the pipe. The hydrostatic head in the tank 11 is very low. If, however, the pressure due to this head in the outlet of the pipe 10 is too great it may be necessary to put a blower 39 of suitable construction in the pipe 10 in order to force the gases from this pipe up through the liquid in the tank 11.

The operation of the apparatus so far described is as follows:

Gases rich in carbon dioxide from any suitable combustion chamber are delivered to the pipe 10 through which they pass beneath the fluid in the tank 11 where they are bubbled up through the fluid. The fluid in the tank is supplied through a water inlet 14 which drains off through a pipe 17. The gas passing up through the liquid and through the finely divided water spray is cleaned of such foreign particles as may be contained in the gas and such gases as readily dissolve in the water. Gas passing up through the baffle plates 13 is robbed of such water vapor as would be mingled with it. In passing through the tank 11 the gas is washed and delivered to the pipe 12 in a relatively clean condition. Of course the gas still is composed of such mixture of gases as came off from the combustion process which gases would not readily dissolve in water at ordinary pressures. The gas passes through the pipe 12 to the intake of a blower 20 by means of which its pressure is sufficiently increased to be forced up through liquid in the tank 22. The blower 20 creating a suction in the pipe 12 may sufficiently lower the pressure within the drum 11 to draw gases from the pipe 10 into the drum 11. If however the blower 20 is not sufficient to cause gas from the pipe 10 to enter the drum 11, a blower may be placed in the pipe 10 to supply sufficient pressure to the gas to bubble it through the liquid in the bottom of the tank 11. Gas under pressure from the blower 20 passes through the pipe 21 to the lower part of the drum 22. The pipe 21 preferably bends upward to form an inverted U, in order to provide a liquid seal 38 where the pipe enters the drum 22. The drum 22, as previously described, has a lye solution circulated therethrough and sprayed into the tank in finely divided particles. The bottom of the tank has a lye solution standing somewhat above the top of the inlet of the pipe 21 to the tank. The gas therefore is bubbled up through the liquid and passes up through the fine spray of lye in the tank, and thence up around the baffle plates 24. When using the unit in recovering carbon dioxide gas the carbon dioxide will be absorbed by the lye solution in the tank 22, to form a bicarbonate of soda or potassium. Such gases, principally nitrogen, as are not absorbed by the lye solution will pass out through the pipe 23 to a flue through which they pass into the air. A portion of the lye solution in the tank 22 is circulated by the lye circulating pump 30. The pump can be so regulated that the lye may be circulated a number of times through the apparatus, thus utilizing its absorbing ability to the greatest extent. The remaining lye solution is withdrawn from the tank 22 by the pump 33 by means of which the fluid is delivered to a lye boiler, where the carbon dioxide is separated from the lye solution and let off, while the weak lye solution is again circulated through the absorber tank.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a system for recovering carbon dioxide gas from a mixture of furnace gases, a scrubbing unit comprising an upright tower having an inlet for the furnace gases near its lower end with means for forcing said furnace gases under pressure into said tower, an inlet for water and an outlet, the said outlet being positioned somewhat above the bottom of the tank to provide a reservoir of water in the tank, the level of the water being positioned above the uppermost portion of the inlet for gases, a series of inverted cone-shaped perforated baffle plates positioned in the upper portion of the tank, an inlet for water extending down through the baffle plates and terminating in a plurality of spray nozzles, substantially as set forth.

2. In a system for recovering carbon dioxide from combustion gases, a scrubbing unit for removing some of the impurities from the gas comprising a vertically positioned tank having a body of water in its lower end and an inlet for the gas to be washed, said inlet entering the tank below the level of the water therein, an outlet for the water positioned to draw off certain impurities in the water which have been deposited from the gas, a series of inverted cone-shaped baffle plates secured near the upper portion of the tank, said baffle plates having perforations therein, said perforations being formed by punched out portions of the plates which portions depend below the baffle plates and assist in removing vapor from the gas in the tank, and an inlet for water extending down through the baffle plates and terminating in a series of nozzles for spraying water into the tank, substantially as set forth.

3. In a system for recovering carbon dioxide from combustion gases, a scrubbing unit for removing some of the impurities from the gas comprising a vertically positioned tank having a body of water in its lower end and an inlet for the gas to be washed, said inlet entering the tank below the level of the water therein, an outlet for the water positioned to draw off certain impurities in the water which have been deposited from the gas, a series of inverted cone-shaped baffle plates secured near the upper portion of the tank, said baffle plates having perforations therein, said perforations being formed by punched out portions of the plates which portions depend below the baffle plates and assist in removing vapor from the gas in the tank, and an inlet for water extending down through the baffle plates and terminating in a series of nozzles for spraying water into the tank, and a baffle plate secured around the edge of the tank between the said nozzles and the level of the water in the tank, substantially as set forth.

4. In a system for recovering carbon dioxide from a mixture of gases containing them, an absorbing unit comprising a vertical tank having a body of liquid containing lye in solution therein, means for delivering the mixture of gases containing carbon dioxide to said tank below the level of the liquid therein, a baffle plate dividing the liquid into two chambers in the bottom of said tank, a pipe for drawing the lye solution from one of said chambers and delivering it into the top of the tank, means for drawing off lye solution from the other chamber and delivering it to a predetermined place, and a plurality of perforated inverted cone-shaped baffle plates surrounding said pipe, the said pipe terminating in a series of nozzles for spraying the lye solution into said tank, substantially as set forth.

In witness whereof, I have hereunto set my hand at Waynesboro, Pennsylvania, this 17th day of January, A. D. nineteen hundred and twenty-nine.

FRANK R. ZUMBRO.